US010766080B2

(12) United States Patent
Hughey et al.

(10) Patent No.: US 10,766,080 B2
(45) Date of Patent: Sep. 8, 2020

(54) MULTIDIAMETER CUTTING TOOL HAVING BALANCED MINIMUM QUANTITY LUBRICATION FLOW AND METHOD OF MANUFACTURING A MULTIDIAMETER CUTTING TOOL

(71) Applicant: Ford Motor Company, Dearborn, MI (US)

(72) Inventors: Ethan Hughey, Royal Oak, MI (US); David Stephenson, Detroit, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 15/972,624

(22) Filed: May 7, 2018

(65) Prior Publication Data

US 2019/0337059 A1    Nov. 7, 2019

(51) Int. Cl.
*B23B 51/06* (2006.01)
*B23B 51/00* (2006.01)

(52) U.S. Cl.
CPC ............ *B23B 51/06* (2013.01); *B23B 51/009* (2013.01); *B23B 2251/202* (2013.01); *B23B 2251/241* (2013.01)

(58) Field of Classification Search
CPC ... B23B 51/06; B23B 51/042; B23B 51/0486; B23B 2231/24; B23B 2250/12;

(Continued)

(56) References Cited

U.S. PATENT DOCUMENTS 3,561,574 A    2/1971    Dickinson, Jr. et al.
6,210,083 B1    4/2001    Kammermeier et al.
(Continued)

FOREIGN PATENT DOCUMENTS

DE    102004055377 A1 *    5/2006    ............. B23B 27/10
GB    2386691    12/2003
WO    WO-2014183742 A2 *    11/2014    ........... B23B 51/009

OTHER PUBLICATIONS

Engineer's Edge, Fluid Pressure Drop Along Pipe Length of Uniform Diameter, https://www.engineersedge.com/fluid_flow/pressure_drop/pressure_drop.htm, retreived Jul. 31, 2019, published Mar. 13, 2006 (Year: 2006).*

(Continued)

*Primary Examiner* — Evan H MacFarlane
(74) *Attorney, Agent, or Firm* — Burris Law, PLLC

(57) ABSTRACT

A cutting tool and method of manufacturing a tool including determining desired flowrates to cutting edges. The method includes calculating pressure drop and passage dimensions for each of an nth-number of passages to the cutting edges based on $I_n = (P_n * A_n^n)/(\rho_n * L_n)$, wherein $I_n$ is nth-passage flow rate, $P_n$ is nth-passage pressure drop, $A_n^n$ is nth-passage cross-sectional area raised to a power n, the power n being equal to 1 or 0.5, $\rho_n$ is nth-passage resistivity, and $L_n$ is nth-passage length. The method includes forming the nth-passages in the tool open to each cutting edge based on the nth-passage dimensions.

10 Claims, 6 Drawing Sheets

(58) Field of Classification Search
CPC ......... B23B 51/009; B23B 27/10; B23C 5/28; Y10T 408/14; Y10T 408/44; Y10T 408/45; Y10T 408/453; Y10T 408/455; Y10T 408/458; B23Q 11/10
See application file for complete search history.

(56) References Cited

U.S. PATENT DOCUMENTS

| | | | |
|---|---|---|---|
| 7,785,046 | B2 | 8/2010 | Beckington |
| 8,291,741 | B2 | 10/2012 | Domange et al. |
| 2003/0223831 | A1* | 12/2003 | Viens ............... B23C 5/006 408/60 |
| 2005/0095072 | A1* | 5/2005 | Gaiser ............... B23B 51/105 408/59 |
| 2012/0082523 | A1* | 4/2012 | Bozkurt ............. B23B 51/009 408/59 |
| 2016/0297042 | A1* | 10/2016 | Koik ............... B23Q 11/1046 |
| 2017/0089854 | A1 | 3/2017 | Bonavides et al. |
| 2018/0133809 | A1* | 5/2018 | Brunner ............... B23C 5/28 |

OTHER PUBLICATIONS

Web Archive of Fluid Pressure Drop Along Pipe Length of Uniform Diameter, https://web.archive.org/web/20060313083317/https://www.engineersedge.conn/fluid_flow/pressure_drop/pressure_drop.htm, retreived Jul. 31, 2019 (Year: 2019).*

Pressure Drop in Circular Pipes calculations—written Jul. 31, 2019 (Year: 2019).*

Minimum Quantity Lubrication (MQL) in Automotive Powertain Machining, Tai. et al., ScienceDirect, Procedia CIRP 14, 2014, p. 526 (Year: 2014).*

The Lee Company, Lohm Laws for Liquids—How to Calculate Flow Resistance for Liquids, available at URL http://leeimh.com/resource-center/lohms/.

New Wave Industries, Inc., Tools, Lee Lohm Calculator, Dec. 21, 2017, available at URL https://play.google.com/store/apps/details?id=com.nwi.lohmcalc&hl=en.

* cited by examiner

MULTIDIAMETER CUTTING TOOL HAVING BALANCED MINIMUM QUANTITY LUBRICATION FLOW AND METHOD OF MANUFACTURING A MULTIDIAMETER CUTTING TOOL

FIELD

The present disclosure relates to a multi-diameter cutting tool having balanced minimum quantity lubrication flow and a method of manufacturing the multi-diameter cutting tool.

BACKGROUND

The statements in this section merely provide background information related to the present disclosure and may not constitute prior art.

Conventional machining uses high volume flow of a liquid lubricant over the cutting edges of the tool. Some tools having multiple cutting diameters have internal passages that provide this liquid lubricant to each cutting edge. Since the liquid lubricant is essentially an incompressible fluid, flow from each passage to each cutting edge remains substantially based on the pressure of the liquid supplied to the tool.

In contrast, minimum quantity lubrication ("MQL") machining uses lubrication supplied to the cutting edges of a tool through a lean air-oil mist, rather than through the high volume liquid-based emulsion in conventional machining. Tools designed for liquid lubricant flow through internal passages suffer from unbalanced lubricant flow when used with the air-oil mist of MQL machining. The ratio of air to oil in the air-oil mist is typically very high and the lubricant mist acts as a compressible fluid (unlike the incompressible liquid lubricant of conventional machining). As a result, a disproportionate volume of the compressible lubricant mist tends to exit the tool via the passages at the larger diameter cutting edges, despite the majority of the cutting taking place at the smaller diameter cutting edges. This can result in wasted lubricant and excess wear on the tool.

The teachings of the present disclosure provide a cutting tool and method of manufacturing a cutting tool having a more balanced lubrication flow for MQL machining that overcomes the problems of typical cutting tools when used for MQL machining.

SUMMARY

In one form, a method of manufacturing a tool includes determining desired flowrates to cutting edges. The method includes calculating pressure drop and passage dimensions for each of an nth-number of passages to the cutting edges based on $I_n = (P_n * A_n^n)/(\rho_n * L_n)$, wherein $I_n$ is nth-passage flow rate, $P_n$ is nth-passage pressure drop, $A_n^n$ is nth-passage cross-sectional area raised to a power n, the power n being equal to 1 or 0.5, $\rho_n$ is nth-passage resistivity, and $L_n$ is nth-passage length. The method includes forming the nth-passages in the tool open to each cutting edge based on the nth-passage dimensions.

According to a further form, the nth-passage resistivity is a constant, non-zero value that is equal for all of the nth-passages.

According to a further form, the method further includes forming a central bore in the tool. Each of the nth-passages includes a first end and a second end. Each first end is open directly to a central bore of the cutting tool and each second end is open directly to a corresponding one of the cutting edges.

According to a further form, the method further includes forming a central bore in the tool. A first nth-passage has a first end and a second end. The first end of the first nth-passage is open to the central bore to receive lubricant directly from the central bore. The second end of the first nth-passage is open to a first one of the cutting edges. A second nth-passage has a first end and a second end. The first end of the second nth-passage is open to the first nth-passage to receive lubricant directly from the first nth-passage. The second end of the second nth-passage is open to a second one of the cutting edges.

According to a further form, the method further includes supplying a lubricant to a central bore of the tool. The central bore is in fluid communication with the nth-passages.

According to a further form, the lubricant includes a mixture of oil and air supplied at an oil flowrate between 5 milliliters per hour and 200 milliliters per hour and at an air flowrate between 30 and 250 liters per minute.

In another form, a method of manufacturing a cutting tool disposed about an axis, the cutting tool configured to have a first cutting face at a first diameter and a second cutting face at a second diameter, includes determining a desired flowrate of lubricant to the first cutting face and a desired flowrate of lubricant to the second cutting face. The method includes forming a main bore in the cutting tool. The main bore is disposed about the axis and configured to receive input lubricant. The method includes forming a first passage in the cutting tool. The first passage has a first end and a second end. The first end of the first passage is in fluid communication with the main bore. The second end of the first passage is configured to provide lubricant to the first cutting face. A cross-sectional area of the first passage and a length of the first passage are calculated according to: $A_1^n/L_1 = I_1 * \rho_1 / P_1$, wherein $A_1^n$ is the cross-sectional area of the first passage raised to a power n, the power n being equal to 1 or 0.5, $L_1$ is the length of the first passage, $I_1$ is the desired flowrate of lubricant to the first cutting face, $\rho_1$ is a resistivity of the first passage, and $P_1$ is a pressure of the lubricant at the first end of the first passage. The method includes forming a second passage in the cutting tool. The second passage has a first end and a second end. The first end of the second passage is in fluid communication with the main bore. The second end of the second passage is configured to provide lubricant to the second cutting face. A cross-sectional area of the second passage and a length of the second passage are calculated according to: $A_2^n/L_2 = I_2 * \rho_2 / P_2$, wherein $A_2^n$ is the cross-sectional area of the second passage raised to the power n, $L_2$ is the length of the second passage, $I_2$ is the desired flowrate to the second cutting face, $\rho_2$ is a resistivity of the second passage, and $P_2$ is a pressure of the lubricant at the first end of the second passage.

According to a further form, the cutting tool is configured to have a third cutting face disposed at a third diameter. The method further includes determining a desired flow rate of lubricant to the third cutting face. The method includes forming a third passage in the cutting tool. The third passage has a first end and a second end. The first end of the third passage is in fluid communication with the main bore. The second end of the third passage is configured to provide lubricant to the third cutting face. A cross-sectional area of the third passage and a length of the third passage being calculated according to: $A_3^n/L_3 = I_3 * \rho_3 / P_3$, wherein $A_n^3$ is the cross-sectional area of the third passage, $L_3$ is the length of the third passage, $I_3$ is the desired flowrate to the third cutting face, $\rho_3$ is a resistivity of the third passage, and $P_3$ is a pressure of the lubricant at the first end of the third passage.

According to a further form, the first passage is open directly to the main bore. The second and third passages are coupled to the main bore by a fourth passage.

According to a further form, the first and second passages are open directly into the main bore.

According to a further form, $\rho_1=\rho_2$.

According to a further form, the step of forming the first passage includes hole extrusion, drilling with a drill bit, or a wire electro discharge machining drilling process.

According to a further form, the first diameter is less than the second diameter and $I_1>I_2$.

In another form, a cutting tool includes a tool head, a first cutting edge, and a second cutting edge. The tool head is disposed about an axis. The tool head defines a main bore, a first passage, and a second passage. The main bore is disposed about the axis and open at a proximal end of the tool head. The proximal end is configured to receive a lubricant into the main bore. The first passage is in fluid communication with the main bore and open to an exterior of the tool head at a first location that is a first radial distance from the axis. A length of the first passage is related to a cross-sectional area of the first passage according to: $A_1''/L_1=I_1*\rho_1/P_1$, wherein $A_1''$ is the cross-sectional area of the first passage raised to a power n, the power n being equal to 1 or 0.5, $L_1$ is the length of the first passage, $I_1$ is a flowrate of the lubricant from the first passage, $\rho_1$ is a resistivity of the first passage, and $P_1$ is a pressure of the lubricant at an end of the first passage proximate to the main bore. The second passage is in fluid communication with the main bore and open to an exterior of the tool head at a second location that is a second radial distance from the axis. The second radial distance is greater than the first radial distance. A length of the second passage is related to a cross-sectional area of the second passage according to: $A_2''/L_2=I_2*\rho_2/P_2$, wherein A is the cross-sectional area of the second passage raised to the power n, $L_2$ is the length of the second passage, $I_2$ is a flowrate of the lubricant from the second passage, $\rho_2$ is a resistivity of the second passage, and $P_2$ is a pressure of the lubricant at an end of the second passage proximate to the main bore. The first cutting edge is fixedly coupled to the tool head at the first location. The second cutting edge is fixedly coupled to the tool head at the second location.

According to a further form, the tool head further defines a third passage in fluid communication with the main bore and open to an exterior of the tool head at a third location that is a third radial distance from the axis. The third radial distance is greater than the second radial distance. A length of the third passage is related to a cross-sectional area of the third passage according to: $A_3''/L_3=I_3*\rho_3/P_3$, wherein $A_3''$ is the cross-sectional area of the third passage raised to the power n, $L_3$ is the length of the third passage, $I_3$ is a flowrate of the lubricant from the third passage, $\rho_3$ is a resistivity of the third passage, and $P_3$ is a pressure of the lubricant at an end of the third passage proximate to the main bore. The cutting tool further includes a third cutting edge fixedly coupled to the tool head at the third location.

According to a further form, the first passage is open directly to the main bore. The second and third passages are coupled to the main bore by a fourth passage.

According to a further form, the first and second passages are open directly into the main bore.

According to a further form, $\rho_1=\rho_2$.

According to a further form, the flow rate of lubricant from the first passage is greater than the flowrate of lubricant from the second passage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
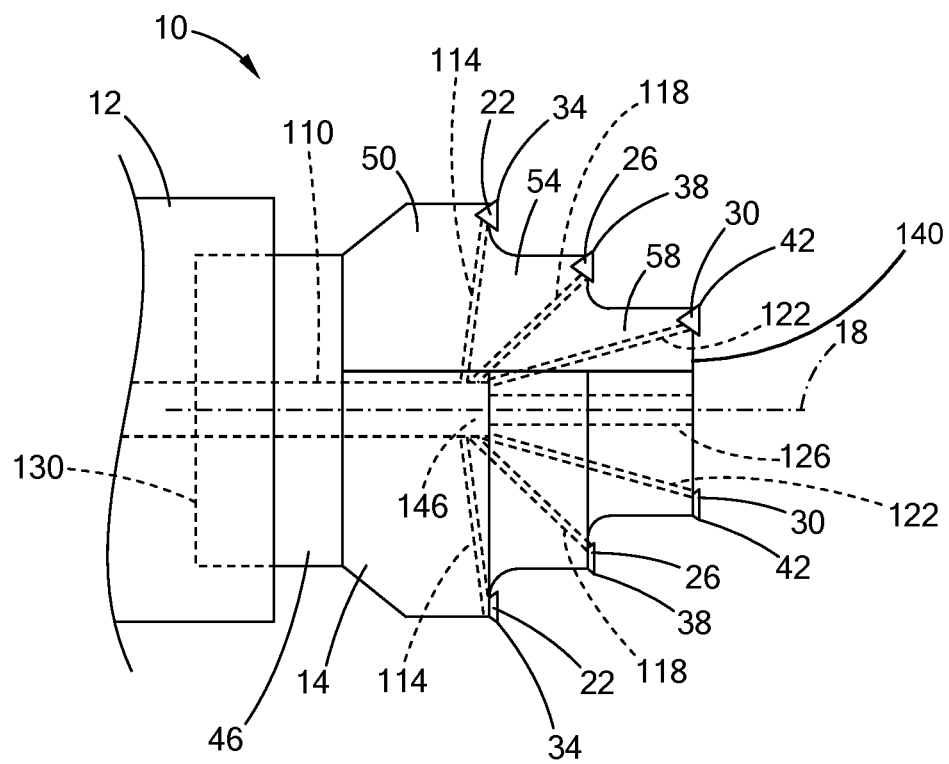
FIG. 1 is a side view of a cutting tool in accordance with the teachings of the present disclosure, illustrating a plurality of lubricant passages within the cutting tool.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
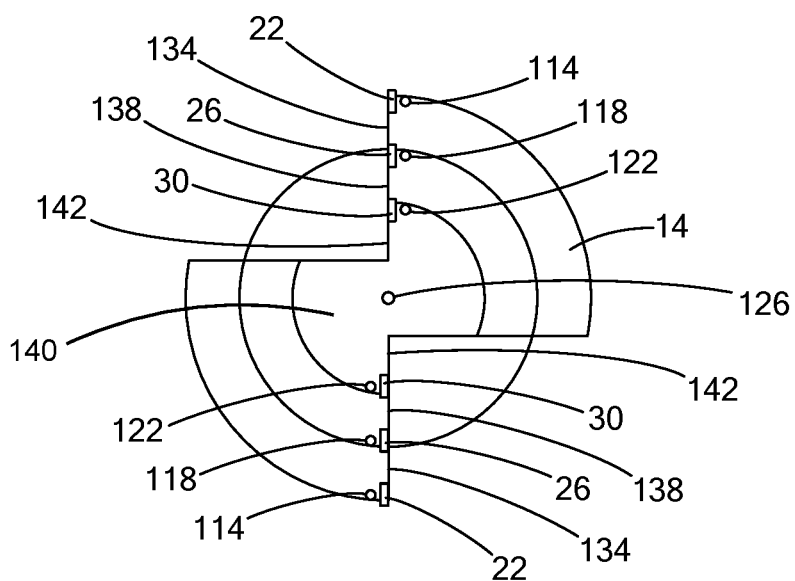
FIG. 2 is a top view of the cutting tool of FIG. 1.

With reference to FIGS. 1 and 2, a cutting tool 10 is illustrated. The cutting tool 10 includes a tool holder 12, a tool head 14 disposed about an axis 18 and a plurality of cutting edges fixedly coupled to the tool head 14 at a plurality of different radial distances from the axis 18 and spaced axially along the tool head 14. Throughout this disclosure, the term "radial distance from the axis" refers to the straight line distance from the axis taken perpendicular to the axis. In the example provided, the tool head 14 is a three-diameter cutting head with cutting edges located at three different radial distances from the axis 18, though more or fewer cutting diameters and corresponding cutting edges can be used. In the example provided, the cutting tool 10 includes three sets of cutting inserts 22, 26, 30 that are fixedly mounted to the cutting head, with the first cutting inserts 22 defining first cutting edges 34 at the first diameter, the second cutting inserts 26 defining second cutting edges 38 at the second diameter, and the third cutting inserts 30 defining third cutting edges 42 at the third diameter. In an alternative configuration, not specifically shown, the cutting edges 34, 38, 42 can be integrally formed in the tool head 14.

Returning to the example provided, the tool head 14 includes a head base 46, a plurality of axial sections and a plurality of lubricant passages that extend within the tool head 14. In the example provided the tool head 14 includes a first section 50, a second section 54, and a third section 58, that correspond to the different cutting diameters, though more or fewer sections can be used depending on the number of cutting diameters. In the example provided, the lubricant passages of the tool head 14 include a main bore 110, a set of first passages 114, a set of second passages 118, a set of third passages 122, and a fourth passage 126, though other configurations can be used.

In the example provided, the head base 46 defines a proximal end 130 of the tool head 14 and is configured to be attached to the tool holder 12. The tool holder 12 can be any suitable type of tool holding device, such as a shrink fit holder, collet, or hydraulic chuck. While not specifically shown, the tool holding device can be part of a drill, a mill, a lathe, or another similar device. In the configuration of a drilling device or milling device, the head base 46 can be configured to be connected to the tool holder 12 so that the tool holder 12 rotates the tool head 14 about the axis 18. In the configuration of a lathe, the tool holder 12 can hold the tool head 14 rotationally stationary while a workpiece (not shown) is rotated. In the example provided, the head base 46 is a generally cylindrical shape about the axis 18.

The first section 50 is axially adjacent to the head base 46 and has a generally cylindrical shape about the axis 18 that has a diameter that corresponds to the first cutting diameter. In the example provided, the diameter of the first section 50 is greater than the diameter of the head base 46. In the example provided, the first section 50 includes two leading faces 134 that are diametrically opposite of each other, though other configurations can be used (e.g., three or more leading faces equally or unequally spaced about the axis 18).

In the example provided, the diameter of the first section 50 is slightly less than the first cutting diameter and the first cutting inserts 22 are mounted to the leading faces 134 of the first section 50 so that the cutting edges 34 of the first cutting inserts 22 extend radially outward of the first section 50 to the first cutting diameter. In the example provided, the first cutting inserts 22 are removably mounted to the leading faces 134 of the first section 50, such as being attached to the leading faces 134 by a screw (not shown) so that the first cutting inserts 22 can be replaced without replacing the entire tool head 14.

The second section 54 is axially adjacent to the first section 50 and has a generally cylindrical shape about the axis 18 that has a diameter that corresponds to the second cutting diameter. The diameter of the second section 54 is less than the diameter of the first section 50. In the example provided, the second section 54 includes two leading faces 138 that are diametrically opposite each other and aligned in the circumferential direction with the leading faces 134 of the first section 50, though other configurations can be used (e.g., three or more leading faces equally or unequally spaced about the axis 18).

In the example provided, the diameter of the second section 54 is slightly less than the second cutting diameter and the second cutting inserts 26 are mounted to the leading faces 138 of the second section 54 so that the cutting edges 38 of the second cutting inserts 26 extend radially outward of the second section 54 to the second cutting diameter. In the example provided, the second cutting inserts 26 are removably mounted to the leading faces 138 of the second section 54, such as being attached to the leading faces 138 by a screw (not shown) so that the second cutting inserts 26 can be replaced without replacing the entire tool head 14.

The third section 58 is axially adjacent to the second section 54 and has a generally cylindrical shape about the axis 18 that has a diameter that corresponds to the third cutting diameter. The diameter of the third section 58 is less than the diameter of the second section 54. The third section 58 defines a distal end 140 of the tool head 14. In the example provided, the third section 58 includes two leading faces 142 that are diametrically opposite each other and aligned in the circumferential direction with the leading faces 138 of the second section 54, though other configurations can be used (e.g., three or more leading faces equally or unequally spaced about the axis 18).

In the example provided, the diameter of the third section 58 is slightly less than the third cutting diameter and the third cutting inserts 30 are mounted to the leading faces 142 of the third section 58 so that the cutting edges 42 of the third cutting inserts 30 extend radially outward of the third section 58 to the third cutting diameter. In the example provided, the third cutting inserts 30 are removably mounted to the leading faces 142 of the third section 58, such as being attached to the leading faces 142 by a screw (not shown) so that the third cutting inserts 30 can be replaced without replacing the entire tool head 14.

The main bore 110 is open through the proximal end 130 of the tool head 14 and is configured to receive a flow of MQL air-oil mist lubricant from the tool holder 12 at an input pressure $P_{in}$. The tool 10 can include a pressurized air source (not shown), such as a compressor and air tank, a reservoir (not shown) configured to hold the oil to be mixed with the air, and an air oil mixing system (not shown) configured to mix the oil with the air and supply the air-oil mist to the tool head 14. The air-oil mist lubricant can be supplied to the main bore 110 at a flowrate of 5-200 milliliters per hour of oil and 30-250 liters per hour of air. The main bore 110 is coaxial with the axis 18 and extends axially from the proximal end 130 into the tool head 14 to be in fluid communication with the other passages 114, 118, 122, 126.

Each first passages 114 has one end that is open to the main bore 110 and an opposite end that is open proximate to a corresponding one of the first cutting inserts 22. Each second passage 118 has one end that is open to the main bore 110 and an opposite end that is open proximate to a corresponding one of the second cutting inserts 26. Each third passage 122 has one end that is open to the main bore 110 and an opposite end that is open proximate to a corresponding one of the third cutting inserts 30. The fourth passage 126 has one end that is open to the main bore 110 and an opposite end that is open through the distal end 140 of the tool head 14. In the example provided, the first, second, third and fourth passages 114, 118, 122, 126 intersect the main bore 110 at the end of the main bore 110 (i.e., at a single axial location 146 within the tool head 14). With additional reference to FIG. 3, the passages 110, 114, 118, 122, 126 of FIG. 1 are illustrated in a schematic form. The air-oil mist lubricant enters the main bore 110 at an input pressure $P_{in}$ and exits each of the passages 114, 118, 122, 126 at zero gage pressure $P_0$.

Figure 3:
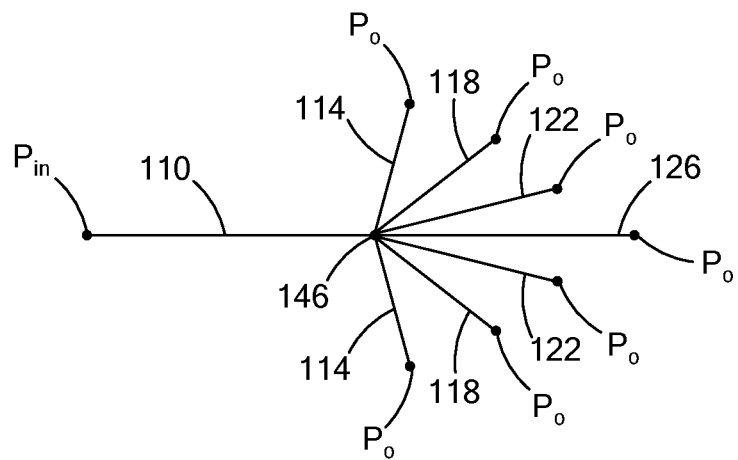
FIG. 3 is a schematic view of the lubricant passages of FIG. 1.
Figure 4:
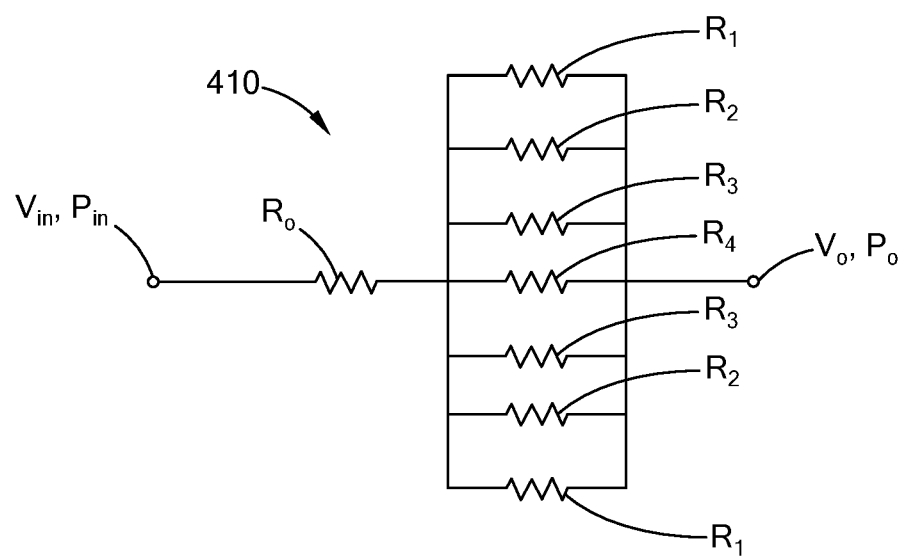
FIG. 4 is a schematic view of an equivalent electrical circuit of the lubricant passages of FIG. 1.

With additional reference to FIG. 4, an equivalent circuit 410 of the passages 110, 114, 118, 122, 126 (FIGS. 1 and 3)

is schematically illustrated. In FIG. 4, the main bore 110 (FIGS. 1 and 3) is represented by a resistor $R_0$, the first passages 114 (FIGS. 1 and 3) are represented by resistors $R_1$, the second passages 118 (FIGS. 1 and 3) are represented by resistors $R_2$, the third passages 122 (FIGS. 1 and 3) are represented by resistors $R_3$, the fourth passage 126 (FIGS. 1 and 3) is represented by resistor $R_4$. Since the first, second, third, and fourth passages 114, 118, 122, 126 (FIGS. 1 and 3) intersect the main bore 110 at the same location and are all open to the atmosphere, the equivalent resistors $R_1$-$R_4$ are parallel to each other and in series with $R_0$. The voltage input to the circuit 410 is represented by $V_{in}$ and the voltage out is represented by $V_O$. $V_{in}$ is equal to $P_{in}$, while $V_O$ is equal to $P_O$. Each resistor has resistance value based on the characteristics of the corresponding passage 110, 114, 118, 122, 126 (FIGS. 1 and 3). The resistance value (e.g., $R_0$-$R_4$) is based on the following relationship between the characteristics of each passage:

$$R = \rho * \left(\frac{L}{A^n}\right)$$

In the above equation, R is the resistance value of the passage, p is the resistivity value of the passage, L is the length of the passage, A is the cross-sectional area of the passage, and the power n is equal to 1 or 0.5. In the example provided, the cross-sectional area of each passage is constant along the entire length of that passage. The resistivity p is based on the average surface roughness of the passage. When all the passages 110, 114, 118, 122, 126 (FIGS. 1 and 3) are formed using the same process of manufacturing (e.g., all passages formed using one of the following: drill bit, wire electro discharge machining, or hole extrusion), then the resistivity p is set equal to 1, though other non-zero constants can be used. If the passages 110, 114, 118, 122, 126 (FIGS. 1 and 3) are formed using different manufacturing processes, then the resistivity values will be the same constant value for passages formed by the same process, but different between passages formed by different processes. For example, if the main bore 110 (FIGS. 1 and 3) is formed using a drill bit, but the other passages 114, 118, 122, 126 (FIGS. 1 and 3) are formed using EDM machining, then the resistivity for the drilled main bore 110 (FIGS. 1 and 3) will be less than the resistivity for EDM formed passages 114, 118, 122, 126 (FIGS. 1 and 3), if the EDM process forms passages that are rougher than the drill bit process.

Accordingly, the resistance values of the passages are provided by the following relationships:

$$R_0 = \rho_0 * \left(\frac{L_0}{A_0^n}\right)$$

$$R_1 = \rho_1 * \left(\frac{L_1}{A_1^n}\right)$$

$$R_2 = \rho_2 * \left(\frac{L_2}{A_2^n}\right)$$

$$R_3 = \rho_3 * \left(\frac{L_3}{A_3^n}\right)$$

$$R_4 = \rho_4 * \left(\frac{L_4}{A_4^n}\right)$$

The flow rates and pressures of each passage 110, 114, 118, 122, 126 (FIGS. 1 and 3) are related to the characteristics of the passages based on the following relationship:

$$P = I*R$$

In the above relationship, P is the pressure drop across the passage, I is the flow rate through the passage, and R is the resistance value discussed above. For example:

$$(P_{in} - P_1) = I_0 * R_0$$

In the above relationship, $P_{in}$ is the input pressure at location 146 (FIGS. 1 and 3), $P_1$ is the pressure at location 146 (FIGS. 1 and 3), $I_0$ is the flowrate through the main bore 110 (FIGS. 1 and 3), and $R_0$ is the equivalent resistance value of the main bore 110 (FIGS. 1 and 3).

The relationships for the remaining passages 114, 118, 122, 126 (FIGS. 1 and 3) are likewise provided by the following relationships:

$$(P_1 - P_0) = I_1 * R_1$$

$$(P_1 - P_0) = I_2 * R_2$$

$$(P_1 - P_0) = I_3 * R_3$$

$$(P_1 - P_0) = I_4 * R_4$$

Since $P_0$ is equal to zero (i.e., atmospheric pressure taken as zero gage pressure), the above relationships simplify to:

$$P_1 = I_1 * R_1$$

$$P_1 = I_2 * R_2$$

$$P_1 = I_3 * R_3$$

$$P_1 = I_4 * R_4$$

Furthermore, the flowrate through the main bore 110 (FIGS. 1 and 3) is related to the flowrates through the other passages 114, 118, 122, 126 (FIGS. 1 and 3) by the following relationship:

$$I_0 = 2(I_1 + I_2 + I_3) + I_4$$

Accordingly, the distribution of lubricant flow to each cutting edge 34, 38, 42 (FIGS. 1 and 2) can be determined as percentages of the total flow rate. For example, if the flow rate to each cutting diameter is to be balanced, then the flow rates can be related based on the following relationship:

$$I_1 = I_2 = I_3 = I_4$$

Using the above relationships, the equivalent resistances $R_1$-$R_4$ are equal and the lengths $L_n$ and the cross-sectional areas $A_n$ of each passage 110, 114, 118, 122, 126 (FIGS. 1 and 3) can be determined.

Alternatively, the distribution of lubricant flow to each cutting diameter can be a different percentage of the total flow rate. For example, the passages 114, 118, 122, 126 (FIGS. 1 and 3) can be configured so that the smaller cutting diameters have greater flow rate than the larger diameters, since the smaller cutting diameters typically experience more use due to the stepped nature of the tool head 14 (FIGS. 1 and 2). While other distributions can be used, one example distribution can be where each of the first passages 114 (FIGS. 1 and 3) can receive 5% of the total flow rate, each of the second passages 118 (FIGS. 1 and 3) can receive 10% of the total flow rate, each of the third passages 122 (FIGS. 1 and 3) can receive 20% of the total flow rate, and the fourth passage 126 (FIGS. 1 and 3) can receive 30% of the total flow rate. In other words, this example distribution can be expressed by the following relationships:

$$I_1 = 0.05 * I_0$$

$$I_2 = 0.10 * I_0$$

$$I_3 = 0.20 * I_0$$

$$I_4 = 0.30 * I_0$$

Similarly, the lengths $L_n$ and the cross-sectional areas $A_n$ of each passage 110, 114, 118, 122, 126 (FIGS. 1 and 3) can be determined for the desired flowrate distribution.

Figure 5:
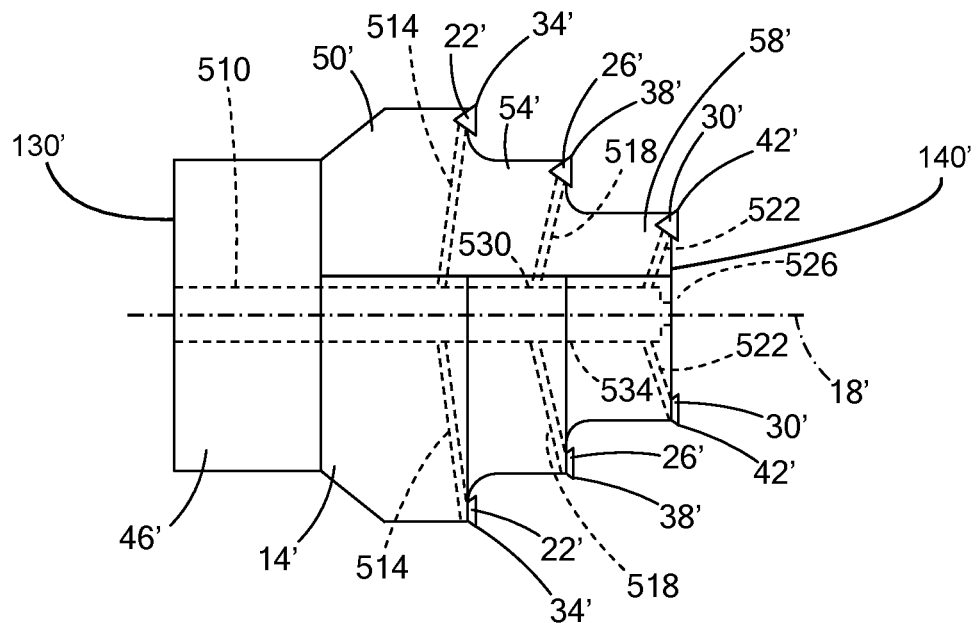
FIG. 5 is a side view of a cutting tool of a second configuration in accordance with the teachings of the present disclosure, illustrating a plurality of lubricant passages within the cutting tool.

With additional reference to FIG. 5, a cutting tool head 14' of a second configuration is illustrated. The tool head 14' is similar to the tool head 14 (FIGS. 1 and 2), except as otherwise shown or described herein. Features that are similar to those shown in FIGS. 1 and 2 and described above are indicated with similar, but primed reference numerals. Accordingly, only differences are described in detail herein.

In the example provided, the lubricant passages are configured differently than the lubricant passages of the tool head 14 (FIGS. 1 and 2). The lubricant passages of the tool head 14' include a main bore 510, a set of first passages 514, a set of second passages 518, a set of third passages 522, a fourth passage 526, a fifth passage 530, and a sixth passage 534, though other configurations can be used.

The main bore 510 is open through the proximal end 130' of the tool head 14' and is configured to receive a flow of MQL air-oil mist lubricant from the tool holder 12 (FIG. 1) at an input pressure $P_{in}$. The air-oil mist lubricant can be supplied to the main bore 510 at a flowrate of 5-200 milliliters per hour of oil and 30-250 liters per hour of air. The main bore 510 is coaxial with the axis 18' and extends axially from the proximal end 130' into the tool head 14' to be in fluid communication with the other passages 514, 518, 522, 526, 530, 534.

Each first passage 514 has one end that is open to the main bore 510 and an opposite end that is open proximate to a corresponding one of the first cutting inserts 22'. The fifth passage 530 has one end that is open to the main bore 510 at the location where the first passages 514 intersect the main bore 510 and an opposite end that is axially distal to the main bore 510. Each second passage 518 has one end that is open to the end of the fifth passage 530 that is opposite the main bore 510. An opposite end of each second passage 518 is open proximate to a corresponding one of the second cutting inserts 26. The sixth passage 534 has one end that is open to the fifth passage 530 at the location where the second passages 518 intersect the fifth passage 530 and an opposite end that is axially distal to the fifth passage 530. Each third passage 522 has one end that is open to the end of the sixth passage 534 that is opposite fifth passage 530. An opposite end of each third passage 522 is open proximate to a corresponding one of the third cutting inserts 30. The fourth passage 526 has one end that is open to the sixth passage 534 at the location where the third passages 522 intersect the sixth passage 534 and an opposite end that is open through the distal end 140' of the tool head 14'. In the example provided, the main bore 510, fourth passage 526, fifth passage 530, and sixth passage 534 are coaxial. With additional reference to FIG. 6, the passages 510, 514, 518, 522, 526, 530, 534 of FIG. 5 are illustrated in a schematic form. The air-oil mist lubricant enters the main bore 510 at an input pressure $P_{in}$ and exits each of the passages 514, 518, 522, 526 at zero gage pressure $P_0$.

Figure 6:
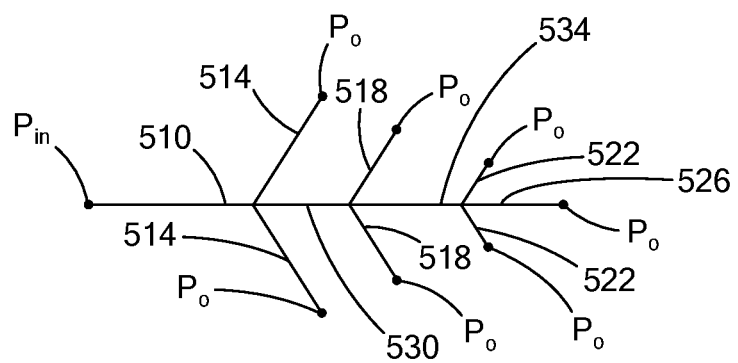
FIG. 6 is a schematic view of the lubricant passages of FIG. 5.
Figure 7:
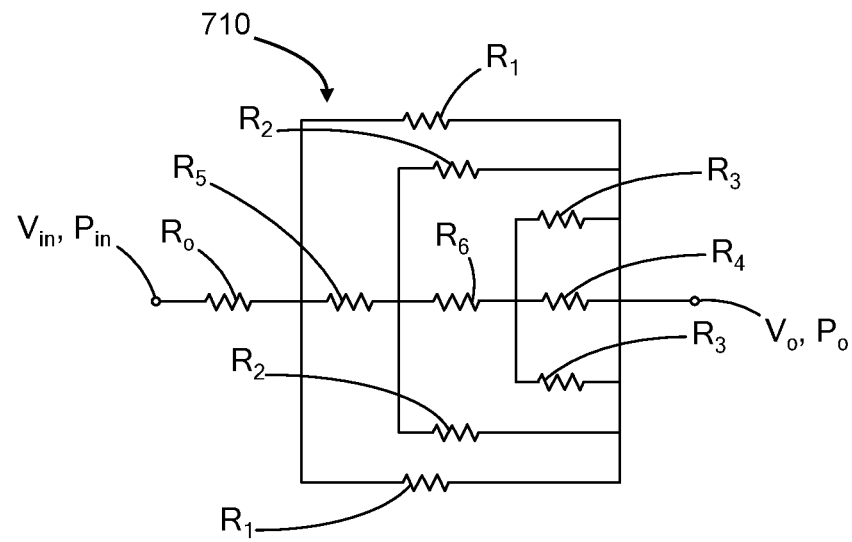
FIG. 7 is a schematic view of an equivalent electrical circuit of the lubricant passages of FIG. 5.

With additional reference to FIG. 7, an equivalent circuit 710 of the passages 510, 514, 518, 522, 526, 530, 534 (FIGS. 5 and 6) is schematically illustrated. In FIG. 7, the main bore 510 is represented by a resistor $R_0$, the first passages 514 (FIGS. 5 and 6) are represented by resistors $R_1$, the second passages 518 (FIGS. 5 and 6) are represented by resistors $R_2$, the third passages 522 (FIGS. 5 and 6) are represented by resistors $R_3$, the fourth passage 526 (FIGS. 5 and 6) is represented by resistor $R_4$, the fifth passage 530 (FIGS. 5 and 6) is represented by resistor $R_5$, and the sixth passage 534 (FIGS. 5 and 6) is represented by resistor $R_6$.

In the example provided, $R_0$ is in series with the equivalent resistance of the $R_1$-$R_6$ resistors. The two $R_1$ resistors are in parallel with each other and in parallel with the equivalent resistance of the $R_2$-$R_6$ resistors. The $R_5$ resistor is in series with the equivalent resistance of the $R_2$, $R_3$, $R_4$ and $R_6$ resistors. The two $R_2$ resistors are in parallel with each other and in parallel with the equivalent resistance of the $R_3$, $R_4$, and $R_6$ resistors. The $R_6$ resistor is in series with the equivalent resistance of $R_3$ and $R_4$ resistors. The $R_3$ and $R_4$ resistors are in parallel with each other.

The voltage input to the circuit 710 is represented by $V_{in}$ and the voltage out is represented by $V_O$. $V_{in}$ is equal to $P_{in}$, while $V_O$ is equal to $P_0$. Each resistor has resistance value based on the characteristics of the corresponding passages 510, 514, 518, 522, 526, 530, 534 (FIGS. 5 and 6). Similar to the resistance values discussed above with reference to FIGS. 1-4, the resistance values (e.g., $R_0$-$R_6$) are based on the following relationship between the characteristics of each passage:

$$R = \rho * \left(\frac{L}{A^n}\right)$$

Accordingly, the resistance values of the passages are provided by the following relationships:

$$R_0 = \rho_0 * \left(\frac{L_0}{A_0^n}\right)$$

$$R_1 = \rho_1 * \left(\frac{L_1}{A_1^n}\right)$$

$$R_2 = \rho_2 * \left(\frac{L_2}{A_2^n}\right)$$

$$R_3 = \rho_3 * \left(\frac{L_3}{A_3^n}\right)$$

$$R_4 = \rho_4 * \left(\frac{L_4}{A_4^n}\right)$$

$$R_5 = \rho_5 * \left(\frac{L_5}{A_5^n}\right)$$

$$R_6 = \rho_6 * \left(\frac{L_6}{A_6^n}\right)$$

Similarly, the flow rates and pressures of each passage 510, 514, 518, 522, 526, 530, 534 (FIGS. 5 and 6) are related to the characteristics of the passages based on the following relationship:

$$P = I * R$$

Similarly, since $P_0$ is taken as zero, the relationships for the passages 510, 514, 518, 522, 526, 530, 534 (FIGS. 5 and 6) are provided by the following relationships:

$$(P_{in} - P_1) = I_0 * R_0$$

$$P_1 = I_1 * R_1$$

$$P_2 = I_2 * R_2$$

$$P_3 = I_3 * R_3$$

$$P_4 = I_4 * R_4$$

$$(P_1 - P_2) = I_5 * R_5$$

$$(P_2 - P_3) = I_6 * R_6$$

Furthermore, the flow rate through the main bore 510 is related to the flow rates through the other passages 514, 518, 522, 526, 530, 534 (FIGS. 5 and 6) by the following relationships:

$$I_0 = 2*I_1 + I_5$$

$$I_5 = 2*I_2 + I_6$$

$$I_6 = 2*I_3 + I_4$$

Accordingly, the distribution of lubricant flow to each cutting edge 34', 38', 42' (FIG. 5) can be determined as percentages of the total flow rate. For example, if the flow rate to each cutting diameter is to be balanced, then the flow rates can be related based on the following relationship:

$$I_1 = I_2 = I_3 = I_4$$

Using the above relationships, the lengths $L_n$ and the cross-sectional areas $A_n$ of each passage 510, 514, 518, 522, 526, 530, 534 (FIGS. 5 and 6) can be determined.

Alternatively, the distribution of lubricant flow to each cutting diameter can be a different percentage of the total flow rate. For example, the passages 514, 518, 522, 526, 530, 534 (FIGS. 5 and 6) can be configured so that the smaller cutting diameters have greater flow rate than the larger diameters, since the smaller cutting diameters typically experience more use due to the stepped nature of the tool head 14' (FIGS. 5 and 6). While other distributions can be used, one example distribution can be where each of the first passages 514 (FIGS. 5 and 6) can receive 5% of the total flow rate, each of the second passages 518 (FIGS. 5 and 6) can receive 10% of the total flow rate, each of the third passages 522 (FIGS. 5 and 6) can receive 20% of the total flow rate, and the fourth passage 526 (FIGS. 5 and 6) can receive 30% of the total flow rate. In other words, this example distribution can be expressed by the following relationships:

$$I_1 = 0.05*I_0$$

$$I_2 = 0.10*I_0$$

$$I_3 = 0.20*I_0$$

$$I_4 = 0.30*I_0$$

$$I_5 = 0.90*I_0$$

$$I_6 = 0.70*I_0$$

Similarly, the lengths $L_n$ and the cross-sectional areas $A_n$ of each passage 510, 514, 518, 522, 526, 530, 534 (FIGS. 5 and 6) can be determined for the desired flowrate distribution.

Figure 8:
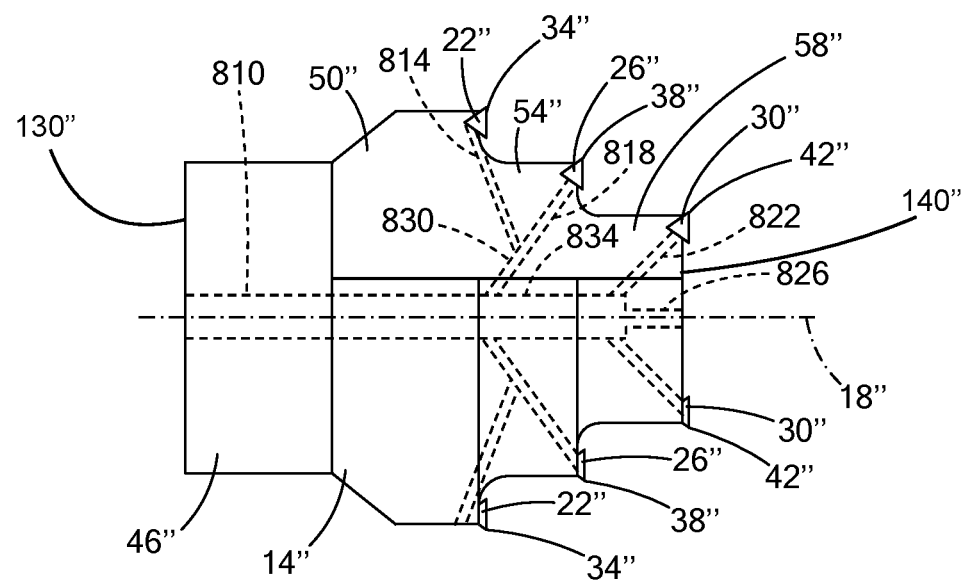
FIG. 8 is a side view of a cutting tool of a third configuration in accordance with the teachings of the present disclosure, illustrating a plurality of lubricant passages within the cutting tool.

With additional reference to FIG. 8, a cutting tool head 14" of a third configuration is illustrated. The tool head 14" is similar to the tool head 14 (FIGS. 1 and 2) and 14' (FIG. 5), except as otherwise shown or described herein. Features that are similar to those shown in FIGS. 1, 2, and 5 and described above are indicated with similar, but double primed reference numerals. Accordingly, only differences are described in detail herein.

In the example provided, the lubricant passages are configured differently than the lubricant passages of the tool head 14 (FIGS. 1 and 2) and 14' (FIG. 5). The lubricant passages of the tool head 14" include a main bore 810, a set of first passages 814, a set of second passages 818, a set of third passages 822, a fourth passage 826, a set of fifth passages 830, and a sixth passage 834, though other configurations can be used.

The main bore 810 is open through the proximal end 130" of the tool head 14" and is configured to receive a flow of MQL air-oil mist lubricant from the tool holder 12 (FIG. 1) at an input pressure Pin. The air-oil mist lubricant can be supplied to the main bore 810 at a flowrate of 5-200 milliliters per hour of oil and 30-250 liters per hour of air. The main bore 810 is coaxial with the axis 18" and extends axially from the proximal end 130" into the tool head 14" to be in fluid communication with the other passages 814, 818, 822, 826, 830, 834.

Each fifth passage 830 has one end that is open to the main bore 810 and extends radially outward from the main bore 810 to a distal end. Each first passage 814 has one end that is open to the distal end of a corresponding one of the fifth passages 830 and an opposite end that is open proximate to a corresponding one of the first cutting inserts 22". Each second passage 818 has one end that is open to a corresponding one of the fifth passages 830 at the same location as the first passage 814 and an opposite end that is open proximate to a corresponding one of the second cutting inserts 26". In the example provided, the fifth passages 830 are coaxial and the same diameter as the second passages 818, though other configurations can be used. The sixth passage 834 has one end that is open to the main bore 810 at the same location as where the fifth passages 830 intersect the main bore 810 and an opposite end that is axially distal from the main bore 810. The third passages 822 have one end that is open to the distal end of the sixth passage 834 and an opposite end that is open to a corresponding one of the third cutting inserts 30". The fourth passage 826 has one end open to the distal end of the sixth passage 834 at the same location where the third passages 822 intersect the sixth passage 834 and an opposite end open to the distal end 140" of the tool head 14". In the example provided, the main bore 810, sixth passage 834, and fourth passage 826 are coaxial, though other configurations can be used.

Figure 9:
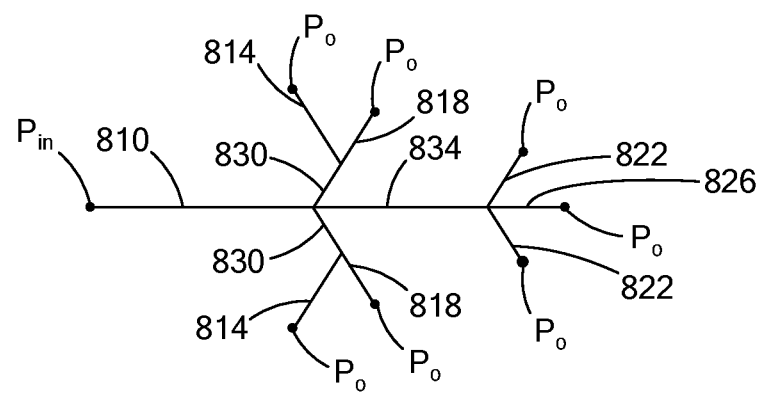
FIG. 9 is a schematic view of the lubricant passages of FIG. 8.

With additional reference to FIG. 9, the passages 810, 814, 818, 822, 826, 830, 834 of FIG. 8 are illustrated in a schematic form. The air-oil mist lubricant enters the main bore 810 at an input pressure $P_{in}$ and exits each of the passages 814, 818, 822, 826 at zero gage pressure $P_0$.

Figure 10:
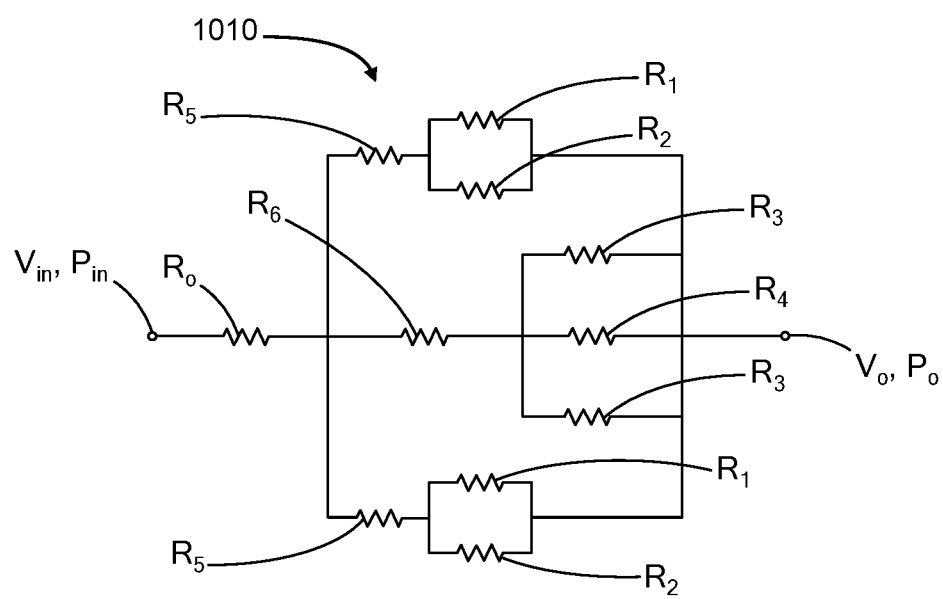
FIG. 10 is a schematic view of an equivalent electrical circuit of the lubricant passages of FIG. 8.

With additional reference to FIG. 10, an equivalent circuit 1010 of the passages 810, 814, 818, 822, 826, 830, 834 (FIGS. 8 and 9) is schematically illustrated. In FIG. 10, the main bore 810 is represented by a resistor $R_0$, the first passages 814 (FIGS. 8 and 9) are represented by resistors $R_1$, the second passages 818 (FIGS. 8 and 9) are represented by resistors $R_2$, the third passages 822 (FIGS. 8 and 9) are represented by resistors $R_3$, the fourth passage 826 (FIGS. 8 and 9) is represented by resistor $R_4$, the fifth passages 830 (FIGS. 8 and 9) are represented by resistors $R_5$, and the sixth passage 834 (FIGS. 8 and 9) is represented by resistor $R_6$.

In the example provided, $R_0$ is in series with the equivalent resistance of the $R_1$-$R_6$ resistors. The equivalent resistance of the $R_1$, $R_2$, and $R_5$ resistors are in parallel with each other and with the equivalent resistance of the $R_3$, $R_4$, and $R_6$ resistors. Each $R_5$ resistor is in series with a parallel configuration of one $R_1$ resistor parallel with one $R_2$ resistor. The $R_6$ resistor is in series with the equivalent resistance of the $R_3$ and $R_4$ resistors. The $R_3$ resistors are in parallel with each other and the $R_4$ resistor.

The voltage input to the circuit 1010 is represented by $V_{in}$ and the voltage out is represented by $V_0$. $V_{in}$ is equal to $P_{in}$, while $V_0$ is equal to $P_0$. Each resistor has resistance value based on the characteristics of the corresponding passages 810, 814, 818, 822, 826, 830, 834 (FIGS. 8 and 9). Similar to the resistance values discussed above with reference to FIGS. 1-7, the resistance values (e.g., $R_0$-$R_6$) are based on the following relationship between the characteristics of each passage:

$$R = \rho * \left(\frac{L}{A^n}\right)$$

Accordingly, the resistance values of the passages are provided by the following relationships:

$$R_0 = \rho_0 * \left(\frac{L_0}{A_0^n}\right)$$

$$R_1 = \rho_1 * \left(\frac{L_1}{A_1^n}\right)$$

$$R_2 = \rho_2 * \left(\frac{L_2}{A_2^n}\right)$$

$$R_3 = \rho_3 * \left(\frac{L_3}{A_3^n}\right)$$

$$R_4 = \rho_4 * \left(\frac{L_4}{A_4^n}\right)$$

$$R_5 = \rho_5 * \left(\frac{L_5}{A_5^n}\right)$$

$$R_6 = \rho_6 * \left(\frac{L_6}{A_6^n}\right)$$

Similarly, the flow rates and pressures of each passage 810, 814, 818, 822, 826, 830, 834 (FIGS. 8 and 9) are related to the characteristics of the passages based on the following relationship:

$$P = I*R$$

Similarly, since $P_0$ is taken as zero, the relationships for the passages 810, 814, 818, 122, 826, 830, 834 (FIGS. 8 and 9) are provided by the following relationships:

$$(P_{in}-P_1) = I_0 * R_0$$

$$(P_1-P_2) = I_5 * R_5$$

$$(P_1-P_3) = I_6 * R_6$$

$$P_2 = I_1 * R_1$$

$$P_2 = I_2 * R_2$$

$$P_3 = I_3 * R_3$$

$$P_3 = I_4 * R_4$$

Furthermore, the flow rate through the main bore 810 is related to the flow rates through the other passages 814, 818, 122, 826, 830, 834 (FIGS. 8 and 9) by the following relationships:

$$I_0 = 2*I_5 + I_6$$

$$I_5 = I_1 + I_2$$

$$I_6 = 2*I_3 + I_4$$

Accordingly, the distribution of lubricant flow to each cutting edge 34", 38", 42" (FIG. 8) can be determined as percentages of the total flow rate. For example, if the flow rate to each cutting diameter is to be balanced, then the flow rates can be related based on the following relationship:

$$I_1 = I_2 = I_3 = I_4$$

Using the above relationships, the lengths $L_n$ and the cross-sectional areas $A_n$ of each passage 810, 814, 818, 822, 826, 830, 834 (FIGS. 8 and 9) can be determined.

Alternatively, the distribution of lubricant flow to each cutting diameter can be a different percentage of the total flow rate. For example, the passages 814, 818, 822, 826, 830, 834 (FIGS. 8 and 9) can be configured so that the smaller cutting diameters have greater flow rate than the larger diameters, since the smaller cutting diameters typically experience more use due to the stepped nature of the tool head 14" (FIG. 8). While other distributions can be used, one example distribution can be where each of the first passages 814 (FIGS. 8 and 9) can receive 5% of the total flow rate, each of the second passages 818 (FIGS. 8 and 9) can receive 10% of the total flow rate, each of the third passages 822 (FIGS. 8 and 9) can receive 20% of the total flow rate, and the fourth passage 826 (FIGS. 8 and 9) can receive 30% of the total flow rate. In other words, this example distribution can be expressed by the following relationships:

$$I_1 = 0.05 * I_0$$

$$I_2 = 0.10 * I_0$$

$$I_3 = 0.20 * I_0$$

$$I_4 = 0.30 * I_0$$

$$I_5 = 0.90 * I_0$$

$$I_6 = 0.70 * I_0$$

Similarly, the lengths $L_n$ and the cross-sectional areas $A_n$ of each passage 810, 814, 818, 822, 826, 830, 834 (FIGS. 8 and 9) can be determined for the desired flowrate distribution.

Figure 11:
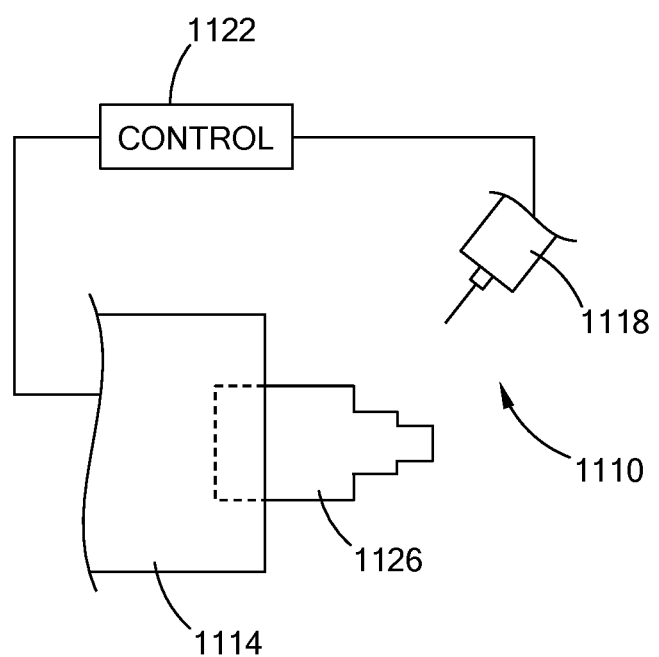
FIG. 11 is a side view of a passage forming device in accordance with the teachings of the present disclosure.

With additional reference to FIG. 11, a device 1110 for manufacturing a cutting tool head (e.g., the tool head 14, 14', or 14") is illustrated. The device 1110 can include a mount 1114 (e.g., a chuck or clamp), a drill 1118 (e.g., a rotary drill with drill bit, or an EDM device and wire), and a control module 1122. The mount 1114 is configured to hold a blank 1126 of the cutting tool. The blank 1126 lacks the internal lubricant passages. The control module 1122 is in communication with the drill 1118 and can be in communication with the mount 1114 and configured to move and operate the drill 1118 to form the passages in the blank.

The method of manufacturing the cutting tool can include inputting the geometry of the blank (e.g., the diameters and locations of the cutting edges and the lengths of the sections of the cutting tool, etc.) into a computer or the control module 1122. The geometry can be in the form of a 2d or 3d computer model. The method can include determining desired flow rates or lubricant distribution to each of the cutting edges. The control module 1122 can then calculate the pressure drop and passage dimensions for each of an nth-number of passages to the cutting edges based on the relations discussed above with reference to FIGS. 1-10, including generally $$I_n = \frac{P_n * A_n^n}{\rho * L_n};$$

wherein $I_n$ is nth-passage flow rate, $P_n$ is nth-passage pressure drop, $A_n$ is nth-passage cross-sectional area, the power n is equal to either 1 or 0.5, $\rho_n$ is nth-passage resistivity, and $L_n$ is nth-passage length. The method can include supporting the blank 1126 in the mount 1114. The control module 1122 can then send control signals to the drill 1118 to form the passages in the blank 1126 to form the cutting tool. The method can also include mounting the cutting tool for use and supplying a mixture of oil and air (e.g., MQL lubricant) through the passages.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a tool disposed about an axis and having a plurality of cutting edges at a plurality of diameters, the method comprising:

determining a desired flowrate to a corresponding one of the plurality of cutting edges at the plurality of diameters for each nth-passage of nth-passages, the nth-passages extending from a central bore to the cutting edges;

calculating a pressure drop, a cross-sectional area, and a length for each of the nth-passages based on $I_n = (P_n * A_n^n)/(\rho_n * L_n)$, wherein $I_n$ is the flowrate of the nth-passage, $P_n$ is the pressure drop of the nth-passage, $A_n^n$ is the cross-sectional area of the nth-passage raised to a power n, the power n being equal to 0.5, $\rho_n$ is an nth-passage resistivity, and $L_n$ is the length of the nth-passage, wherein one of the nth-passages has one end open to the central bore and an opposite end open through a terminal end-most surface of the tool; and forming the nth-passages and the central bore in the tool such that each of the nth-passages is open to the central bore and open to the corresponding one of the cutting edges, wherein each of the nth-passages is formed edge based on the calculated $A_n^n$ and $L_n$ for the nth-passage.

2. The method of claim 1, wherein the nth-passage resistivity is a constant, non-zero value that is equal for all of the nth-passages.

3. The method of claim 1, wherein a first one of the nth-passages has a first end and a second end, the first end of the first one of the nth-passages being open to the central bore to receive lubricant directly from the central bore, the second end of the first one of the nth-passages being open to a first one of the cutting edges, wherein a second one of the nth-passages has a first end and a second end, the first end of the second one of the nth-passages being open to the first one of the nth-passages to receive lubricant directly from the first one of the nth-passages, the second end of the second one of the nth-passages being open to a second one of the cutting edges.

4. A method of manufacturing a cutting tool disposed about an axis, the cutting tool configured to have a first cutting face at a first diameter and a second cutting face at a second diameter, the method comprising:

determining a desired flowrate of lubricant to the first cutting face and a desired flowrate of lubricant to the second cutting face;

forming a main bore in the cutting tool, the main bore being disposed about the axis and configured to receive input lubricant;

forming a first passage in the cutting tool, the first passage having a first end and a second end, the first end of the first passage being in fluid communication with the main bore, the second end of the first passage being configured to provide lubricant to the first cutting face, a cross-sectional area of the first passage and a length of the first passage being calculated according to: $A_1^n/L_1 = I_1 * \rho_1/P_1$, wherein $A_a^n$ is the cross-sectional area of the first passage raised to a power n, the power n being equal to 0.5, $L_1$ is the length of the first passage, $Ii_1$ is the desired flowrate of lubricant to the first cutting face, $\rho_1$ is a resistivity of the first passage, and Pi is a pressure of lubricant at the first end of the first passage;

forming a second passage in the cutting tool, the second passage having a first end and a second end, the first end of the second passage being in fluid communication with the main bore, the second end of the second passage being configured to provide lubricant to the second cutting face, a cross-sectional area of the second passage and a length of the second passage being calculated according to: $A_2^n/L_2 = I_2 * \rho_2/P_2$, wherein $A_2^n$ is the cross-sectional area of the second passage raised to the power n, $L2$ is the length of the second passage, $1_2$ is the desired flowrate to the second cutting face, $\rho_2$ is a resistivity of the second passage, and $P_2$ is a pressure of lubricant at the first end of the second passage; and forming a distal passage in the cutting tool, the distal passage having a first end open to and configured to receive lubricant from the main bore and a second end open through a terminal end-most surface of the too.

5. The method of claim 4, wherein $\rho_1 = \rho_2$.

6. The method of claim 4, wherein the step of forming the first passage includes hole extrusion, drilling with a drill bit, or a wire electro discharge machining drilling process.

7. The method of claim 4, wherein the first diameter is less than the second diameter and $I_1 > I_2$.

8. The method of claim 4, wherein the cutting tool is configured to have a third cutting face disposed at a third diameter, the method further comprising:

determining a desired flow rate of lubricant to the third cutting face;

forming a third passage in the cutting tool, the third passage having a first end and a second end, the first end of the third passage being in fluid communication with the main bore, the second end of the third passage being configured to provide lubricant to the third cutting face, a cross-sectional area of the third passage and a length of the third passage being calculated according to: $A_3^n/L_3 = I_3 * \rho_3/P_3$, wherein $A_3^n$ is the cross-sectional area of the third passage raised to the power n, $L_3$ is the length of the third passage, $I_3$ is the desired flowrate to the third cutting face, $\rho_3$ is a resistivity of the third passage, and $P_3$ is a pressure of lubricant at the first end of the third passage.

9. The method of claim 8, wherein the first passage is open directly to the main bore, wherein the second and third passages are coupled to the main bore by a fourth passage.

10. The method of claim 4, wherein the first and second passages are open directly into the main bore.

* * * * *